Aug. 2, 1927.

D. W. CHISHOLM 1,637,679

TUBE WELDING MACHINE

Filed Jan. 26, 1925    3 Sheets-Sheet 3

INVENTOR
DOUGLAS WHIMSTER CHISHOLM
By John B. Brady.
Attorney

Patented Aug. 2, 1927.

1,637,679

UNITED STATES PATENT OFFICE.

DOUGLAS WHIMSTER CHISHOLM, OF GARNKIRK, SCOTLAND, ASSIGNOR TO THE BIRCHFIELD ENGINEERING COMPANY LIMITED, OF CARDIFF, WALES.

TUBE-WELDING MACHINE.

Application filed January 26, 1925, Serial No. 4,977, and in Great Britain April 22, 1924.

This invention relates to tube welding machines of the type wherein a heated metal strip is drawn through a bell or die, and, a suitable welding gas being applied to the edges of the strip, the same are closed and welded together by the action of rolls and (or) other suitable devices.

The object of the present invention is to provide means whereby the die can be easily interchanged; whereby should a skelp stick in the die, both die and skelp can be quickly removed and the work allowed to proceed; whereby the upper roll can be quickly moved into and out of position; whereby the various operations can be effected by power; and whereby, in general, the output per unit of time of welded tubes may be increased.

According to the invention a tube welding machine is provided wherein the die through which the heated metal strip is drawn from the furnace is gripped equally around its peripheral surface by two separate and similar jaw members, carried by slides, which, with the members thereon, are capable of simultaneous horizontal movement towards or away from each other to grip or release respectively the said die. The said slides may be in the form of slidable tubes and may be operated by screw shafts driven by power. A pair of superposed closing rolls is used in conjunction with the die, the upper closing roll being supported in bearings on a vertically slidable frame which is journalled at each end thereof in guides and is capable of being raised or lowered by power with respect to the lower roll. To operate the movable parts of the tube welding machine, power may be derived from any suitable source, preferably the drawchain wheel shaft of the draw bench, reversible driving gear being provided for the movable upper closing roll, and for the slides carrying the jaw members for the die.

In the process of manufacture it occasionally happens that a heated strip sticks in the die and cannot be skelped by the action of the draw chain. In accordance with the present invention, a method of rapidly interchanging the welding die is provided to meet this contingency, the said method comprising the steps of simultaneously drawing apart the jaw members which normally hold the die in operative position, raising the upper closing roll of the machine, removing the die and strip so released, replacing the removed die by another die, moving the said jaw members together simultaneously so as to grip and hold in operative position the last mentioned die, and lowering the upper closing roll into operative relationship to the lower roll so that the work may proceed without loss of time.

One constructional form of the invention is shown, by way of example, on the accompanying sheet of drawings, whereon:—

Referring to the drawings:—

Figure 1:
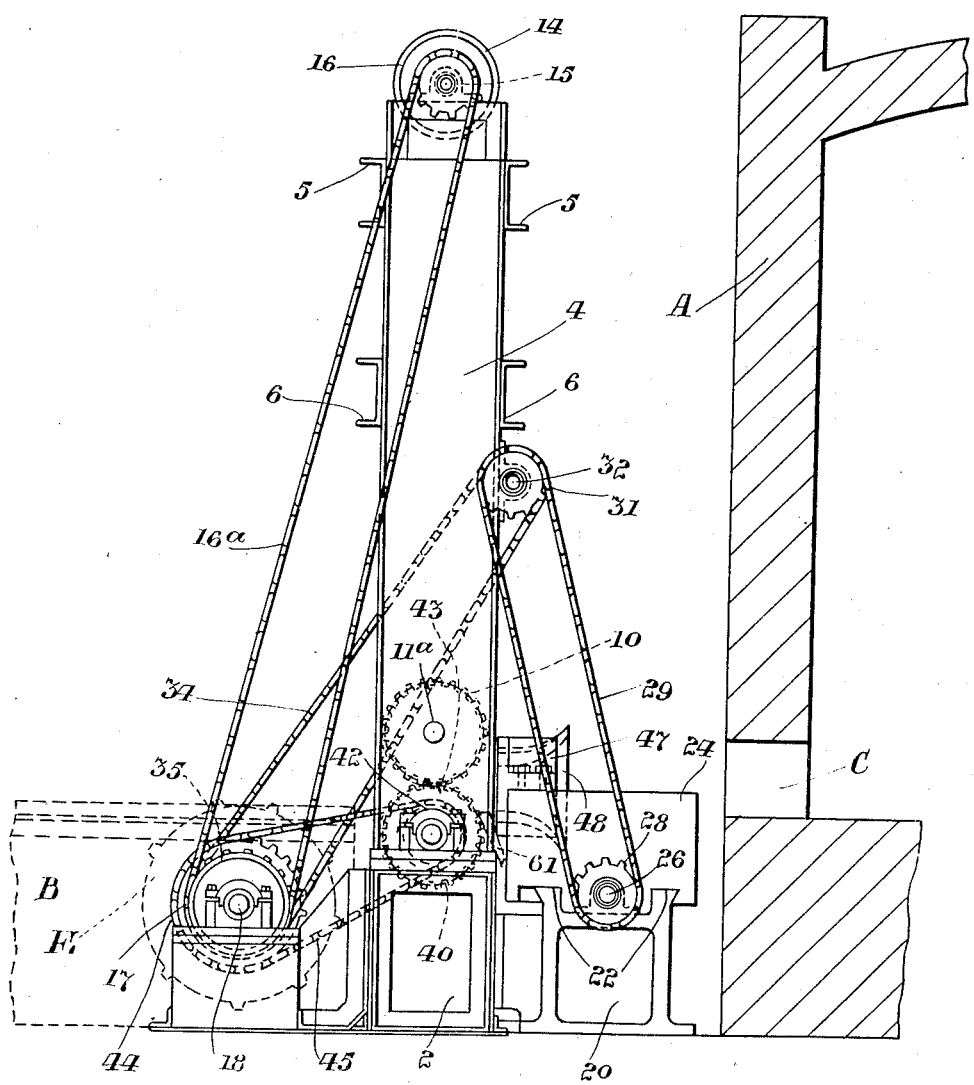
Fig. 1 is a side view of the tube welding machine.

The frame of the machine consists of foundation members 1, 2, upon which are erected the supporting columns 3 and 4, carrying the transverse girders 5, 6. These girders carry the vertical guides 7 and 8 forming a guideway for the slide frame 9, the lower end of which is arranged to carry the upper roll 10 in bearing brackets 11, 11$^a$. Vertical movement of the upper closing roll 10 is obtained by means of the screwed shaft 12 working in a bearing nut 12$^a$ supported on the transverse girders 5, the screw being revolved by means of the bevel wheels 13, 14, through shafting 15 and chain and sprocket gear 16, 16$^a$, 17, from the driving shaft 18 of the draw bench chain wheel E.

Figure 2:
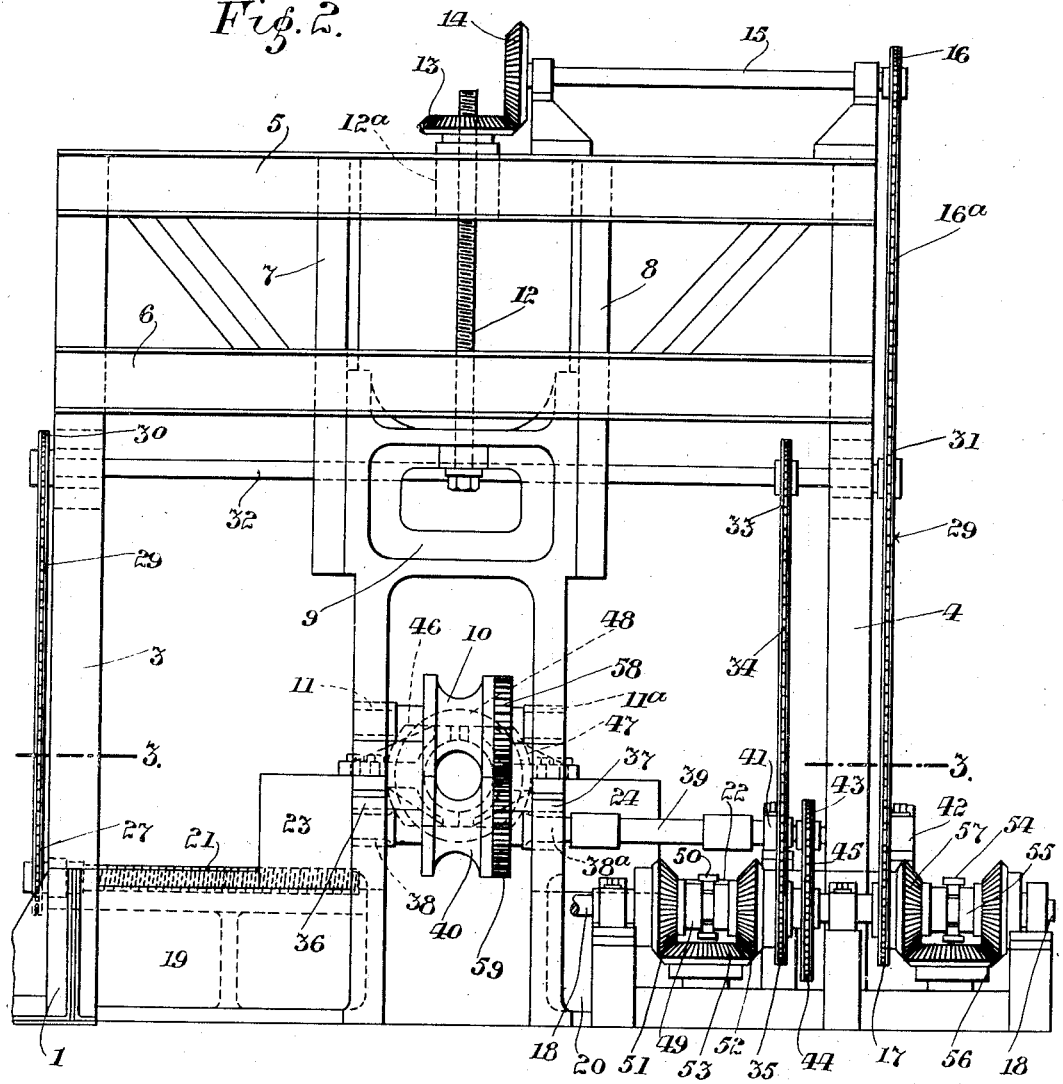
Fig. 2 is a front elevation of the same, with the main driving gear.

Adjoining the foundation members 1, 2, and secured thereto are bed plates 19 and 20, the upper faces of which are formed with dovetail guides 21, 22. Slidable tables 23, 24, are arranged upon the guide-ways 21, 22, respectively, and are capable of being moved laterally in either direction (Figs. 2 and 3) along these guides by means of the screw shafts 25 and 26, which as will be seen are screwed right and left hand. The screw shafts 25, 26, are provided with sprocket wheels 27, 28, respectively driven through chains 29, 29, by the sprocket wheels 30 and 31 mounted upon the shaft 32. On the shaft 32 is a sprocket wheel 33 which through the chain 34 receives driving motion from the sprocket wheel 35 on the main shaft 18. The bed-plates 19, 20, are formed with brackets 36 and 37 respectively, which, at 38 and 38ᵃ, are arranged to carry the shaft 39 upon which is mounted the lower roll 40. The shaft 39 is also journalled at 41 and 42 on the foundation member 2, and between these bearings 41, 42, there is secured on the shaft the sprocket wheel 43. On the main shaft 18 is mounted a sprocket wheel 44 which by means of the chain 45 drives the sprocket wheel 43.

Figure 5:
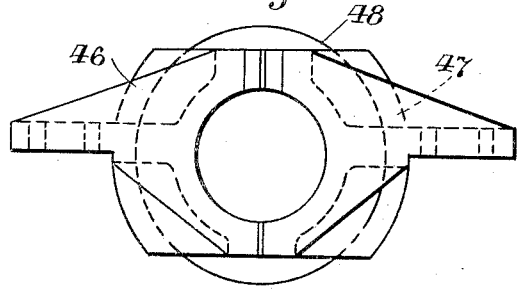
Figs. 5 and 6 show the bell-holder in elevation and plan respectively, the bell being shown in the holder.
Figure 6:
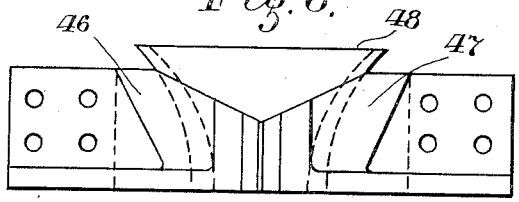

Firmly secured to the slidable tables 23, 24, are the jaw members, 46 and 47, respectively, of the bell-holder. The jaw members grip the bell or die 48 (see Fig. 5) and hold it steady during the welding process, whilst by drawing apart the slidable tables 23, 24, by the screws 25, 26, the bell or die is quickly released and may be lifted out of position and interchanged.

Figure 3:
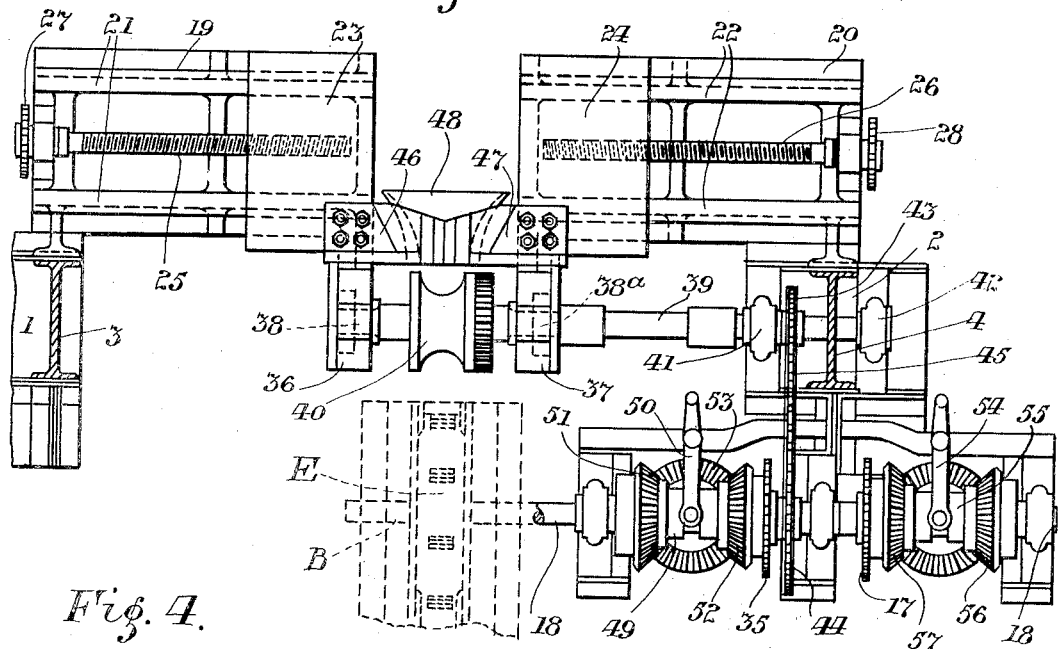
Fig. 3 is a sectional plan view taken on the line X—X Fig. 2.
Figure 4:
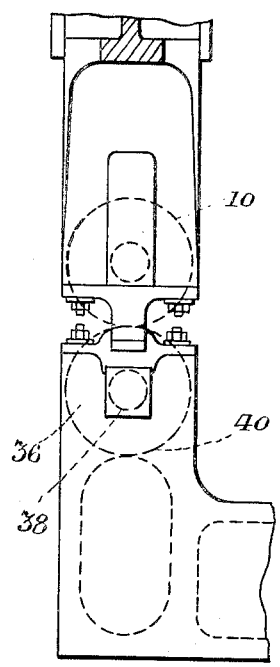
Fig. 4 is a fragmentary view showing in section the construction and disposition of the brackets carrying the closing rolls.

The tube welding machine may be provided with any suitable reversible driving gear one form being shown in Fig. 3. The dog-clutch 49 is adapted to rotate with and is slidable on the main shaft 18, so that by means of the forked lever 50 the clutch may be made to engage either of the loosely mounted bevel wheels 51 and 52. Integral with the bevel wheel 52 is the sprocket wheel 35 which therefore can be driven positively from the main shaft 18, through the clutch 49 being made to engage the bevel wheel 52. The sprocket wheel 35 is driven reversely when the clutch is made to engage the bevel wheel 51 the drive being then transmitted to the wheel 52 through the intermediate wheel 53.

Likewise the sprocket wheel 17 may be made to rotate in either direction by operating the forked lever 54 to put the dog clutch 55 into engagement with the bevel wheel 56 or bevel wheel 57.

The sprocket wheel 44 is arranged to rotate with the main shaft 18, and, through the chain 45 and sprocket wheel 43, drives the lower roll 40 which in turn rotates the upper roll 10 by means of any suitable gearing, as, for example, the toothed extensions 58 and 59 of the closing rolls.

To illustrate the relative position of the tube welding machine, the furnace and draw bench are shown in dotted lines (Figs. 1 and 3) at A and B respectively. The heated metal strip is drawn from the furnace through the door C and the bell or die 48. Thereafter a suitable welding gas from the nozzle 61 having been applied to the underside of the strip at the edges thereof, the said edges are closed and welded together in known manner, by the closing rolls 10, 40, the welded tube travelling along the draw bench B as usual.

As a convenient source of power the chain wheel shaft of the draw bench is shown as being utilized, but the parts may be driven from an independent motor if so desired.

It is obvious from the foregoing that the welding bells can be easily changed on opening and closing the holder; that should a skelped strip stick in a bell both the bell and strip can be quickly removed on raising the top roll 10 and opening the holder. Owing to the arrangement of gearing the upper roll can be quickly raised and lowered as desired.

Having now fully described my invention what I claim and desire to secure by Letters Patent is:—

1. A tube welding machine comprising a bell-shaped die, two separate and similar jaw members adapted to grip equally therebetween the peripheral surface of the die, slidable tables carrying the said members, means for effecting simultaneous horizontal movement of the said tables towards or away from each other to grip or release the die, a pair of superposed upper and lower rolls, a beam structure, fixed brackets on the said structure bearings on said brackets for the lower roll, a movable frame, vertical journals carried by the said structure for each side of said frame, bearings on the said frame to support the upper roll, means to raise and lower the said frame, caps for retaining the upper roll bearings, a lug integral with each of said caps, caps for retaining the lower roll bearings, and a recess formed in each of said last mentioned caps said lugs engaging with said recesses to interlock said rolls when together against relative horizontal movement, and means for rotating the rolls.

2. A tube welding machine comprising a bell-shaped die, two separate and similar jaw members adapted to grip equally therebetween the peripheral surface of the die, slidable tables carrying the said members, screw shafts for said tables adapted to effect simultaneous horizontal movement of said tables towards or away from each other to directly grip or release respectively the said die, a driven shaft, chain and sprocket gear connecting said driven shaft and the screw shafts for the slidable tables, a pair of superposed upper and lower rolls, a beam structure, fixed brackets on the said structure, bearings on said brackets for the lower roll, a movable frame, vertical journals carried by the said structure for each side of said frame, bearings on the said frame to support the upper roll, a central screw shaft to support said frame and effect vertical movement thereof, a bearing nut in which the said screw shaft is mounted, bevel gear to rotate said nut, chain and sprocket gear between said chain wheel shaft and said central screw shaft, caps for retaining the upper roll bearings, a lug integral with each of said caps, caps for retaining the lower roll bearings, and a recess formed in each of said last mentioned caps said lugs engaging with the said recesses to interlock said rolls when together against relative horizontal movement, toothed extensions on the upper and lower closing rolls, and chain and sprocket wheel gear connecting said driven shaft and the lower roll.

3. In a tube welding machine a frame structure, a drive gear in said frame structure, a pair of jaw members arranged to be simultaneously adjusted by said drive gear toward or away from each other having their faces recessed for directly gripping a bell shaped die, a pair of roller members, one of said roller members being journaled in a position adjacent said bell shaped die and the other of said roller members being vertically adjustable toward or away from said aforementioned roller member, and connections between said drive gear and said adjustable roller member whereby said jaw members and said roller members may be simultaneously separated by the operation of said drive gear.

4. In a tube welding machine a frame structure, a drive gear positioned in said frame structure, a pair of jaw members simultaneously movable toward or away from each other in the same plane within said frame structure upon operation of said drive gear, each of said jaw members being recessed to directly grip a bell shaped die therebetween, a pair of roller members, each arranged adjacent one end of said bell shaped die, one of said roller members being journaled in said frame structure and the other of said roller members being adjustable toward or away from said first mentioned roller member in a direction at right angles to the direction of movement of said jaw members and connections between said adjustable roller members and said drive gear whereby said roller members may be separated simultaneously with the separation of said jaw members for the releasing of said bell shaped die and the tube passing through said roller members.

In testimony whereof I affix my signature.

DOUGLAS WHIMSTER CHISHOLM.